(12) United States Patent
Rudrapatna

(10) Patent No.: US 9,106,305 B2
(45) Date of Patent: *Aug. 11, 2015

(54) MULTIPLE ACCESS SPREAD SPECTRUM SWITCHING METHODOLOGY

(71) Applicant: AT&T Intellectual Property II, L.P., Atlanta, GA (US)

(72) Inventor: Ashok N. Rudrapatna, Basking Ridge, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/860,713

(22) Filed: Apr. 11, 2013

(65) Prior Publication Data

US 2013/0229977 A1    Sep. 5, 2013

Related U.S. Application Data

(63) Continuation of application No. 12/802,261, filed on Jun. 3, 2010, now Pat. No. 8,446,857, which is a continuation of application No. 12/220,553, filed on Jul. 26, 2008, now Pat. No. 7,756,071, which is a continuation of application No. 11/245,572, filed on Oct. 7, 2005, now Pat. No. 7,417,965, which is a continuation of application No. 09/302,762, filed on Apr. 30, 1999, now Pat. No. 6,980,531.

(60) Provisional application No. 60/110,624, filed on Dec. 2, 1998.

(51) Int. Cl.
*H04B 7/212* (2006.01)
*H04B 7/216* (2006.01)
*H04B 7/185* (2006.01)

(52) U.S. Cl.
CPC ............ *H04B 7/216* (2013.01); *H04B 7/18532* (2013.01)

(58) Field of Classification Search
USPC ................. 370/310, 315, 316, 319–323, 325, 370/329–335, 342, 441; 375/130, 141–146; 455/427, 428, 12.1–13.3
See application file for complete search history.

(56) References Cited

U.S. PATENT DOCUMENTS

| | | |
|---|---|---|
| 4,577,313 A | 3/1986 | Sy |
| 4,813,036 A | 3/1989 | Whitehead |
| 4,901,307 A | 2/1990 | Gilhousen et al. |
| 4,926,422 A | 5/1990 | Alaria et al. |
| 5,084,900 A | 1/1992 | Taylor |
| 5,103,459 A | 4/1992 | Gilhousen et al. |

(Continued)

OTHER PUBLICATIONS

Berner et al, MOBS—A Modular On-Board Switching System, IEEE, pp. 1769-1773, 1988.

(Continued)

*Primary Examiner* — Frank Duong

(57) ABSTRACT

A low-cost, low-power, low-complexity, small, high-reliability, robust, seamless satellite communication network is described. The network performs encoding of a user signal at the customer premises to enable routing of the user signal to an appropriate destination beam at the satellite requiring low power user signal processing. Routing information is embedded at the periphery of the network CPE's rather than at the satellite. Embedding the routing information in this way greatly reduces on-board switching complexity and increases signal to interference ratio for the user.

20 Claims, 4 Drawing Sheets

(56) References Cited

U.S. PATENT DOCUMENTS

| | | |
|---|---|---|
| 5,566,164 A | 10/1996 | Ohlson |
| 5,757,767 A | 5/1998 | Zehavi |
| 5,764,630 A | 6/1998 | Natali et al. |
| 5,805,579 A | 9/1998 | Erving et al. |
| 5,815,527 A | 9/1998 | Erving et al. |
| 5,838,669 A | 11/1998 | Gerakoulis |
| 5,875,181 A | 2/1999 | Hsu et al. |
| 5,878,037 A | 3/1999 | Sherman |
| 5,966,371 A | 10/1999 | Sherman |
| 6,072,770 A | 6/2000 | Ho et al. |
| 6,081,531 A | 6/2000 | Haber |
| 6,144,654 A | 11/2000 | Ibanez-Meier et al. |
| 6,157,621 A | 12/2000 | Brown et al. |
| 6,707,802 B1 | 3/2004 | Sherman |

OTHER PUBLICATIONS

Jolfaei et al, Concept of On-Board-Processing Satellites, IEEE, pp. 391-394, 1992.

Hager, High Speed On-Board Processing and Switching, IEEE, pp. 229-234, 1993.

Gerakoulis et al, Thoughput Evaluation of a Satellite Switched CDMA(SS/CDMA)Demand Assignment System, IEEE, pp. 3632-3638, Nov. 1998.

MULTIPLE ACCESS SPREAD SPECTRUM SWITCHING METHODOLOGY

This application is a continuation of application Ser. No. 12/802,261, entitled "Multiple Access Spread Spectrum Switching Methodology," filed on Jun. 3, 2010 and issued on May 21, 2013 as U.S. Pat. No. 8,446,857; which is a continuation of application Ser. No. 12/220,553, entitled "Multiple Access Spread Spectrum Switching Methodology," filed on Jul. 26, 2008, and issued on Jul. 13, 2010 as U.S. Pat. No. 7,756,071; which is a continuation of application Ser. No. 11/245,572, entitled "Multiple Access Spread Spectrum Switching Methodology," filed on Oct. 7, 2005, and issued on Aug. 26, 2008 as U.S. Pat. No. 7,417,965; which is a continuation of application Ser. No. 09/302,762, entitled "Multiple Access Spread Spectrum Switching Methodology," filed on Apr. 30, 1999, and issued on Dec. 27, 2005 as U.S. Pat. No. 6,980,531, which claims the benefit of U.S. Provisional Patent Application Ser. No. 60/110,624 filed Dec. 2, 1998, the contents of which is incorporated by reference herein.

BACKGROUND OF THE INVENTION

1. Field of Invention

This invention relates to the switching of multiple access and/or multiplexed signals and more particularly to the switching of multiple access and/or multiplexed spread spectrum signals. More specifically, this invention relates to the switching of multiple access spread spectrum signals at a beam level, such as in a satellite system where an origination signal contains information from a plurality of users that is destined to a plurality of users which are located on separate destination beams.

2. Description of Related Art

Traditionally, satellite communication systems consist of a "bent-pipe" arrangement in which signals originating from a ground station have to be transmitted to a ground-based switching center where the switched signal is transmitted back to the satellite. This added transmission hop introduces additional delay and, in the case of cellular/PCS type communication, the delay is both noticeable and intolerable.

It is conventionally known to use a repeater located on the satellite to retransmit a signal from one ground station to another ground station. See, for example, U.S. Pat. Nos. 4,901,307 and 5,103,459, both to Gilhousen et al. Such conventional bent pipe systems simply repeat the origination beam on a particular destination beam without decoding and recombining multiple individual signals onto multiple destination beams.

It is also conventionally known to control contention for spread spectrum satellite communications using retransmission schemes for lost or corrupted code division multiple access (CDMA) originating signals. See, for example, U.S. Pat. No. 5,084,900 to Taylor. CDMA is a multiple access scheme using code sequences for identifying traffic channels in a common radio channel.

Various techniques are known for on-board satellite controller and switching matrices. See, for example, U.S. Pat. No. 4,926,422 to Alaria et al. However, in such conventional spread spectrum satellite communications systems and methods, a satellite receives a CDMA origination signal originating from a user and then repeats the user's signal on the appropriate destination beam. In some conventional satellite communications systems, such as particular ground station spread spectrum encoders, CDMA signals incoming to a particular base station are encoded into a combined origination signal and transmitted to a satellite. See, for example, U.S. Pat. No. 5,757,767 to Zehavi. Such conventional spread spectrum satellite communications systems receive a multiple user CDMA origination signal and decode the user signals at the satellite. Subsequently, the user signals are recombined according to the destination beams.

Alternatively, methods are known in which multiple user signals are encoded at a base station into a single CDMA origination signal. See, for example, U.S. Pat. No. 5,805,579 to Erving et al., U.S. Pat. No. 5,566,164 to Ohlson and U.S. Pat. No. 5,764,630 to Natali et al.

Methods are also known for encoding a signal at the transmitting customer premises equipment (CPE) to ensure end-to-end integrity during travel to the encoded signal destination. See, for example, U.S. Pat. No. 4,577,313 to Sy. Such encoding of the signal at the transmitting CPE ensures data integrity through to a destination by preventing the signal from being decoded and recombined.

More complex on-board switching designs require digital hardware elements for each user signal, e.g., call, which greatly increases installation and maintenance costs, user service rates, and decreases signal-to-interference (S/I) ratios. Alternatively, it is conventionally known to minimize active on-board satellite switching in a satellite communication system. See, for example, U.S. Pat. No. 4,813,036 to Whitehead. Origination signals from ground stations to the satellite are transmitted on predetermined carrier frequencies that are dedicated to particular satellite destination beams. This results in the signals being repeated with no need for on-board switching.

Additionally, U.S. Pat. No. 5,805,579 to Erving et al. discloses an on-board switching system that processes origination beams and the included traffic channels at a symbol level rather than at the bit level. However, the symbol level corresponds to the user level. While the system has reduced complexity when compared to a switching system that switches signals at the bit level, the system is still very complex since there must be circuitry to determine the destination of each user signal. Accordingly, only when the destination of each user signal has been determined, can the signal be switched to the appropriate destination beam.

SUMMARY OF THE INVENTION

However, there remains a need for a seamless, flexible satellite communication network that can provide desired user services with high performance while still keeping switching equipment costs a minimum. The present invention introduces a distributed switching arrangement that utilizes matched filtering techniques to minimize the complexity of the switching fabric. This invention solves the current problem of performing robust, seamless communication without adding undue complexity and cost to the on-board communications equipment by switching user signals at the beam level rather than at the user level.

This invention separately provides a method and apparatus that reduces complexity and decreases signal bit-error rate for communication networks. By reducing the complexity of the satellite communication networks, the cost and maintenance of the satellite communication network is also reduced.

This invention separately uses ground station baseband self-routing to encode user signals per beam instead of per user to simplify on-board satellite design. The originating customer premises equipment (CPE) is assigned a particular origination beam. Exemplary CPE includes, but is not limited to, the Qualcomm Q 800, Q 1900, QCP-820, QCP-1920, QCP-800 and QCP-1900. Each destination CPE is assigned a particular destination beam depending on geographic location known at user-signal set-up time.

This invention separately calculates the on-board switching equipment volume to decrease bit-error rate by taking into account the number of origination and destination beams. The resulting decrease in bit-error rate improves user signal performance.

This invention separately uses common coding schemes at the originating and destination customer premises equipment sites to perform self-routing of user signals to the appropriate destination for more robust, flexible, and seamless performance.

This invention also separately provides a method and system that dynamically switches communications to an on-board, self-routing network when the number of origination and destination satellite beams exceed the number of system users by a predetermined threshold and causes a predetermined system condition to occur.

This invention separately uses baseband self-routing to switch user signals on a per-beam basis instead of on a per-user basis in order to reduce the complexity of the on-board switching fabric.

This invention separately provides a communication system in which switching equipment that receives encoded user signals on a particular origination path, e.g., an uplink satellite beam, routes the encoded user signals at a path level, i.e., routes the encoded user signals based on the encoded user signals' origination path and the user signals' particular destination path, e.g., downlink satellite beam.

DETAILED DESCRIPTION OF EXEMPLARY EMBODIMENTS

Figure 1:
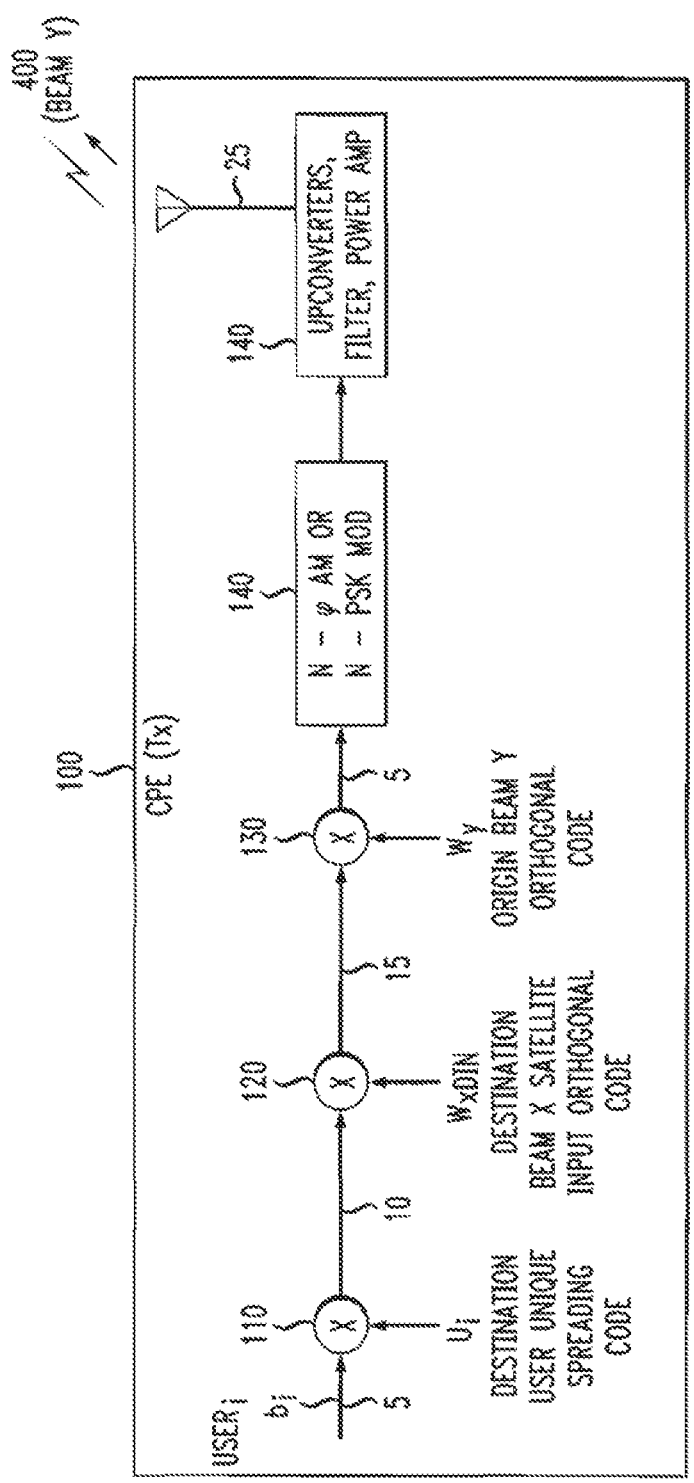
FIG. 1 shows an exemplary embodiment of a transmitting CPE and the transmit functions provided therein used in conjunction with the present invention.

When user signals are transmitted in a satellite environment in which several beams are available for origination beam transmission from the transmitter to the satellite and several beams are available for destination beam transmission from the satellite to the destination receiver, a switching function, i.e., routing incoming user signals from an origination beam to an appropriate destination beam, is necessary. Such a switching function, performed in a conventional way on-board a satellite, utilizes devices that consume significant amounts of power, may be heavy and bulky (relative to the overall weight and dimensions of a satellite) and are generally expensive. Hence, there exists a need to provide switching capability that is light-weight, less bulky, consumes a minimal amount of power and is inexpensive.

The invention achieves these and other objectives by minimizing the amount of switching necessarily performed on-board the satellite. In the exemplary embodiments, this is achieved using match-filter type circuitry, wherein the switch does not process information for individual user signals, but instead ensures that all user signals (collectively) destined to a particular destination beam from each origination beam are routed to that destination beam. The switching circuitry need not recognize which individual sending or receiving user signal is involved. Therefore, the on-board switching circuitry only determines to which destination beam the user signal is destined.

The operation of the on-board switching circuitry works in conjunction with pre-switching circuitry located at the input side and post-switching circuitry located at the output side.

In essence, the on-board switching circuitry acts as two sets of filters. Each of a first set of filters corresponds to an origination beam. Each of the second set of filters corresponds to a destination beam. As the user signals are processed by the on-board switching circuitry, the user signals that are received at the satellite are input to the various filters in the first and second sets. User signals transmitted on a particular origination beam pass through a corresponding filter of the first set of filters. User signals transmitted on any other origination beam do not pass through that filter. Additionally, user signals that are destined for a particular destination beam pass through a corresponding filter of the second set of filters. User signals not destined for a particular destination beam do not pass through that filter. Every user signal transmitted to the satellite on an origination beam passes through the two sets of filters that selectively route the user signal to an appropriate destination beam.

In this conceptual explanation, the number of filters in each set of filters is limited to approximately the number of origination and destination beams, respectively, as opposed to the number of transmitting users transmitting user signals and receiving users receiving signals. This reduced set provides a reduced cost because switching is performed at the beam level rather than at the user level. Note, generally, the number of users is orders of magnitude higher than the number of origination and destination beams. This reduction of circuitry based on the number of origination and destination beams results in a drastic reduction of the amount of hardware necessary to operate because realizing such a set of filters in on-board switching circuitry drastically reduces the amount of necessary hardware—less weight, less cost, less spatial requirements, etc. These reductions stem from the reduced switching complexity necessary to handle the user signals on the origination and destination beams.

In essence, the on-board switching fabric is made up of a bank of input and a bank of output filters. The input filters are hard-wired, i.e., pre-connected to specific output filters, at the time of manufacture, requiring no user signal-by-user signal processing or connection establishment. Each user data is encoded with a specific set of input and output masks at the originating CPE, CPE(Tx). Only specific input filters permit all users with specific input masks to pass via the match filter, rejecting all users with different masks. In a similar manner, output filters permit all users with specific output masks to pass via the match filter, rejecting all users with different masks. These two stages, in a conceptual way, route all user signals appropriately.

Thus, each conceptual filter analyzes whether the user signal was transmitted by the filter's associated origination beam or whether the user signal is destined for the filter's associated destination beam—if so, the user signal is passed through that particular set of filters for transmission on a particular destination beam to a receiving user. Alternatively, if the user signal was not transmitted by that filter's associated origination beam or, when the filter corresponds to a destination beam, if the user signal is not destined for that particular filter's associated destination beam, the user signal is rejected, i.e., filtered out. Subsequently, such a rejected user signal is input to other filters until both an origination beam filter and a destination beam filter pass the user signal so that the user signal is transmitted on a destination beam to be routed to a receiving user.

Following an origination beam filter and destination beam filter passing the user signal, the user signal is transmitted on a destination beam to a ground station where switching to the user is performed at the user level.

In a first exemplary embodiment of the invention, user signals from a plurality of users are transmitted to a satellite on origination beams and switched to the appropriate outgoing, destination beams without processing the user signals at the user level. This switching scheme, in which routing information is embedded at or near the user signal transmission origin, e.g., on the ground by the user equipment CPE or ground station, reduces the necessary complexity of the on-board satellite switching equipment.

In the exemplary embodiments of the invention, CDMA is used to transmit the user signals. CDMA is a wideband spread spectrum technique that allows information to be spread throughout a vast portion of the transmission bandwidth. Rather than assigning user signals to a particular portion of the bandwidth, as done with analog systems, user signals are assigned a unique code which differentiates the various user entities. Practicing the present invention in conjunction with spread spectrum coding, e.g., CDMA, allows multiple user signals originating from a plurality of base station to be combined so that user signals destined for the same outgoing beam can be routed to the appropriate destination beam with minimal switching performed on-board the satellite.

FIGS. 1-4 are provided for illustrative purposes. Even though the figures show a single transmitting CPE (Tx), satellite, and receiving CPE (Rx), there will be a plurality of similar CPEs transmitting to the satellite on the same origination beam. Furthermore, the transmitting CPE, CPE(Tx), and/or the receiving CPE, CPE(Rx), can support one or more signals from one or more users. Regardless of whether a single user is producing more than one user signal for transmission, or multiple users are each producing one signal or multiple signals for transmission, the system can route each user signal independently. Likewise, a single receiving user may receive a single user signal, or multiple independently routed user signals, and multiple users may each receive a single user signal, or multiple independently-routed user signals, at the same receiving CPE (Rx).

Additionally, there are other user signals from other origination beams that require switching to the same destination beam. Moreover, the origination and destination communication paths can be bi-directional, and/or may be symmetrical or asymmetrical. Hence, while the figures are intended to illustrate communication involving origination paths, on-board switching and destination paths, the figures are not intended as a limitation or a departure from the true spirit of the invention.

In a first exemplary embodiment, a user, user$_i$, uses an originating CPE, CPE(Tx), to transmit an information bit stream b$_i$, that is assigned to a particular origination beam, e.g., based on location. Each destination CPE, CPE(Rx), is assigned a particular destination beam, e.g., depending on its location, and this assignment occurs during a provisioning phase, conventionally known and not explained herein. The CDMA transmission establishment and dissolution are well known in the art, and as such, are not discussed herein.

As mentioned above, the exemplary embodiments of the invention use CDMA orthogonal coding schemes to perform baseband self-routing at the originating and destination CPE in an effort to reduce the volume of satellite on-board switching equipment to correspond to the number of origination and destination beams rather than correspond to the number of system users.

FIG. 1 shows an illustrative embodiment of the present invention. An originating user utilizing a customer premises equipment CPE(Tx) 100, communicates informational bit stream, b$_i$, via a satellite 200, shown in FIG. 2, with a destination user utilizing a customer premises equipment (CPE (Tx)), 300, shown in FIG. 3. User, denotes information destined for user i.

Timing considerations, e.g., pilot code synchronization sequence, associated with CDMA air-interface systems are well-known to those skilled in the art and therefore are not discussed in great detail. For simplicity, only one direction of transmission is shown. There can be multiple links, and the information exchange may be bi-directional over a specific link. Even though the link is bi-directional, it does not have to be symmetrical. This discussion of the exemplary embodiments of the invention assumes that all signaling to set up the system is previously performed.

As shown in FIG. 1, the originating CPE(Tx) 100 uses three digital encoders to uniquely route the user signal to the appropriate receiving user. Baseband encoding simplifies the satellite switching complexity and decreases bit-error rates for the communications system. The exemplary embodiment uses standard CDMA coding techniques and an air-interface access scheme as an illustrative example; however this application does not serve as a limiting factor.

Discussion of the invention assumes that an appropriate conventional user signal establishment procedure has been completed. Additionally, through the previous signaling process, the destination beam that corresponds to the destination user CPE(Rx) 300, shown in FIG. 3, must be known. Each origination and destination beam has a particular beam code.

As shown in FIG. 1, a first digital encoder 110 applies a unique destination user code sequence, U$_i$, (unique to the destination, or destination beam) on the originating digital bit-stream signal, b$_i$, 5; b$_i$ is the user transmitted bit stream. CDMA spreading using code U$_i$ is performed on b$_i$. A user unique gold code U$_i$ is used to illustrate the idea of a unique code; however, this code is merely illustrative—other codes that may be used include, but are not limited to, Walsh codes, PN sequences, orthogonal or non-orthogonal codes, etc. All that is required is that the bit stream b$_i$ is pre-spread using the destination user code U$_i$.

Following application of a user code U$_i$ by the encoder 110 to produce a first intermediate origination beam digital user signal 10, a second digital encoder 120 applies a second spreading process using the destination beam X code. This can be performed by applying an orthogonal code, W$_{xDin}$ to the intermediate user signal 10 as a cover code or to further spread the signal. In the alternative, instead of using an orthogonal code to spread each chip via a secondary chip, a cover code which does a chip-for-chip masking may be utilized. This process of second coding associated with the destination beam code uniquely maps the user signal to a particular destination beam 500, shown in FIG. 3 and discussed in detail below. The beam code of the destination beam is determined during user signal initiation and set-up procedures. The second digital encoder 120 produces a second intermediate origination beam digital user signal 15.

A third digital encoder 130 applies another unique orthogonal code, W$_y$, sequence to the second intermediate origination beam digital user signal 15 to identify the user signal with the particular origination satellite beam used to transmit the user signal to the satellite. The third digital encoder 130 produces a third intermediate origination beam digital user signal 20. Since the codes applied by the second and third digital encoders 120 and 130 are orthogonal, each satellite beam 400 may be isolated from each other.

Subsequently, the third intermediate origination beam digital user signal 20 is prepared for transmission by an appropriate combination of conventional modulators, filters and amplifiers. For example, the system may include conventional radio processing devices 140 (for example, 16-QAM and/or 8-PSK modulators, up-converters, filters, and/or power amplifiers) to produce and radio transmit a spread spectrum signal 25 to the satellite 200 on a particular origination beam 400. The radio processing devices 140 up-convert the modulated signal to the appropriate frequency, filter the modulated signal to ensure that the signal is confined to the appropriate band, amplify the signal power and transmit the spread spectrum signal.

Figure 2:
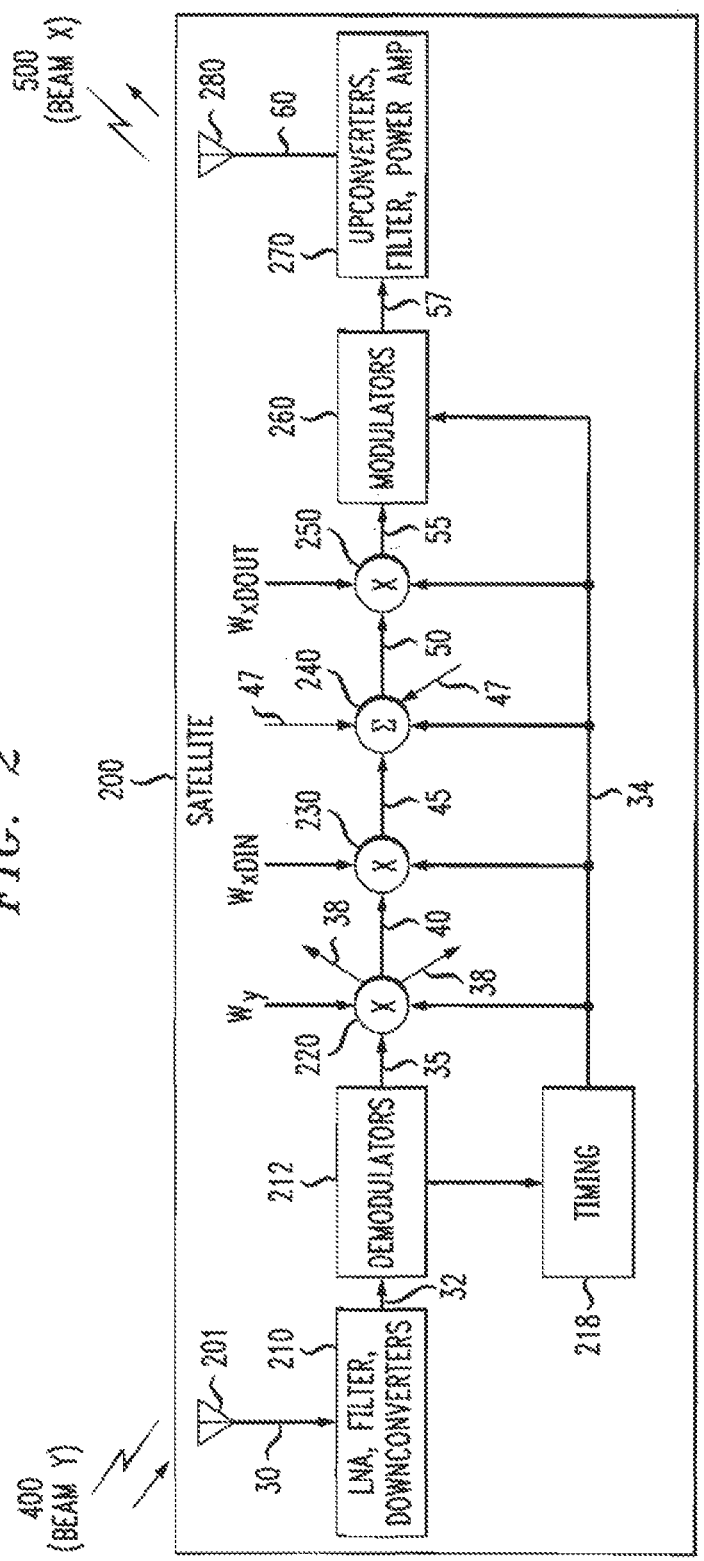
FIG. 2 shows an illustrative embodiment of a satellite and receive and transmit functions provided therein used in conjunction with the present invention.

As shown in FIG. 2, at the satellite 200, satellite receiver antenna 201 receives a plurality of origination beams including origination beam 400 (Beam Y), each beam containing user signals from a plurality of users. Following receipt of origination beam 400 (Beam Y), it is processed by conventional radio processing devices 210 (for example, low-noise amplifiers, filters and down-converters). These conventional radio processing devices 210 convert the user signal 30 transmitted on the origination beam 400 (Beam Y) into an intermediate signal 32 that is input to a demodulator 212. The demodulator 212 demodulates the intermediate signal 32 and outputs a digital spread spectrum signal 35. Timing circuit 218 extracts or recovers information regarding timing from the demodulator 212 and produces a timing signal 34 used for spreading and re-spreading in other on-board processing devices.

Subsequently, the digital signal 35 is fed to a first digital CDMA decoder 220 that extracts all digital user signals received in a particular origination beam 400 and rejects user signals in all other origination beams, e.g., sidelobes from neighboring beams, to produce an intermediate digital signal 40. In the satellite 200, the origination beam code $W_y$ is already known. Therefore, in the first digital CDMA decoder 220, the chipping sequence $W_y$ associated with origination beam 400 (Beam Y) is applied to the digital signal 35 to produce signal 40. $W_y$ is the orthogonal code associated with origination beam 400 (Beam Y). Note that decoder 220 uses the same sequence applied in the third encoder 130. This multiplication acts as a match filter permitting only users from this Beam Y.

In essence, the satellite circuitry rejects all user signals from beams other than origination beam 400 (Beam Y). In FIG. 2, the arrows 38 traveling outward from decoder 220 indicate that user signals to other destination beams are filtered by other filters similar to a second digital decoder 230. Note that $W_{xDin}$ corresponds to the orthogonal code applied in the second encoder 120. Therefore, 220 isolates the user signals of origination beam 400 (Beam Y) by reject all other user origination beams.

A second filtering process is applied by multiplying $W_{xDin}$ to the signal; this isolates the signal to the particular outgoing destination beam 500 (Beam X). Thus, the intermediate digital signal 40 is fed to the second digital decoder 230 that applies a second orthogonal sequence to encode the digital signal into an encoded digital signal 45 for the particular destination beam 500 transmitted to destination CPE (Rx) 300, shown in FIG. 3. Therefore, the application of the second orthogonal sequence further isolates the output to only the user signals from the origination beam 400 destined for the destination beam 500. That is, the second digital decoder 230 rejects all user signals that are not destined for the particular destination beam 500 (Beam X), thereby producing isolated user signals 45. The isolated user signals 45 only contain user signals from origination beam 400 (Beam Y) destined for the particular destination beam 500 (Beam X). All user signals from other incoming beams were filtered in first digital decoder 220 and all user signals destined for other destination beams were rejected in the second digital decoder 230.

The encoded digital signal 45 is then fed through a digital summing circuit 240 that combines all the digital signals from all users for all origination beams intended for beam 500, including user signals from origination beam 400 (Beam Y) and user signals 47 from all other origination beams received by satellite 200 via filters similar to decoder 220, to produce a summation signal 50. Summing is performed by summer 240 on all the signals in a time-synchronized manner. The summation signal 50 is then fed to a third digital encoder 250 that applies an orthogonal sequence on the summation signal 50 to better isolate the particular destination beam 500 (Beam Y). The third digital encoder 250 applies the orthogonal code $W_{xDout}$, i.e., the destination beam 500 (Beam Y) orthogonal code, to the summation signal 50 to produce the modified summation signal 55. The operation of the third digital encoder 250 to orthogonal encode the summation signal improves the signal-to-interference ratio for the destination transmission.

Note that in FIG. 1, at the second encoder 120, the orthogonal code $W_{xDin}$ was applied to the signal—here orthogonal code $W_{xDout}$ is applied. The codes $W_{xDin}$ and $W_{xDout}$ could be similar or different. If $W_{xDin}$ and $W_{xDout}$ are different, isolation is provided so that users who are at the edge of a cell, i.e., geographic area, do not receive signals from neighboring destination beams. Hence, the isolation, in effect, filters out interfering signals. Therefore, using different $W_{xDin}$ and $W_{xDout}$ allows the third digital decoder 250 to provide modified summation signal 55 with inter-cell interference protection.

The modified summation signal 55 is then input into modulator 260 that modulates signal 55 to produce modulated signal 57. The signal 57 is input to conventional radio frequency transmitting devices 270, as described above, to radio transmit a spread spectrum signal 60 on the particular destination beam 500 (Beam Y) to the destination CPE(Rx) 300.

The spread spectrum RF signal, i.e., spot beam, 60 is then transmitted over the satellite antenna 280. Antenna 280 could be a horn antenna, phase array type antenna, etc.

Figure 3:
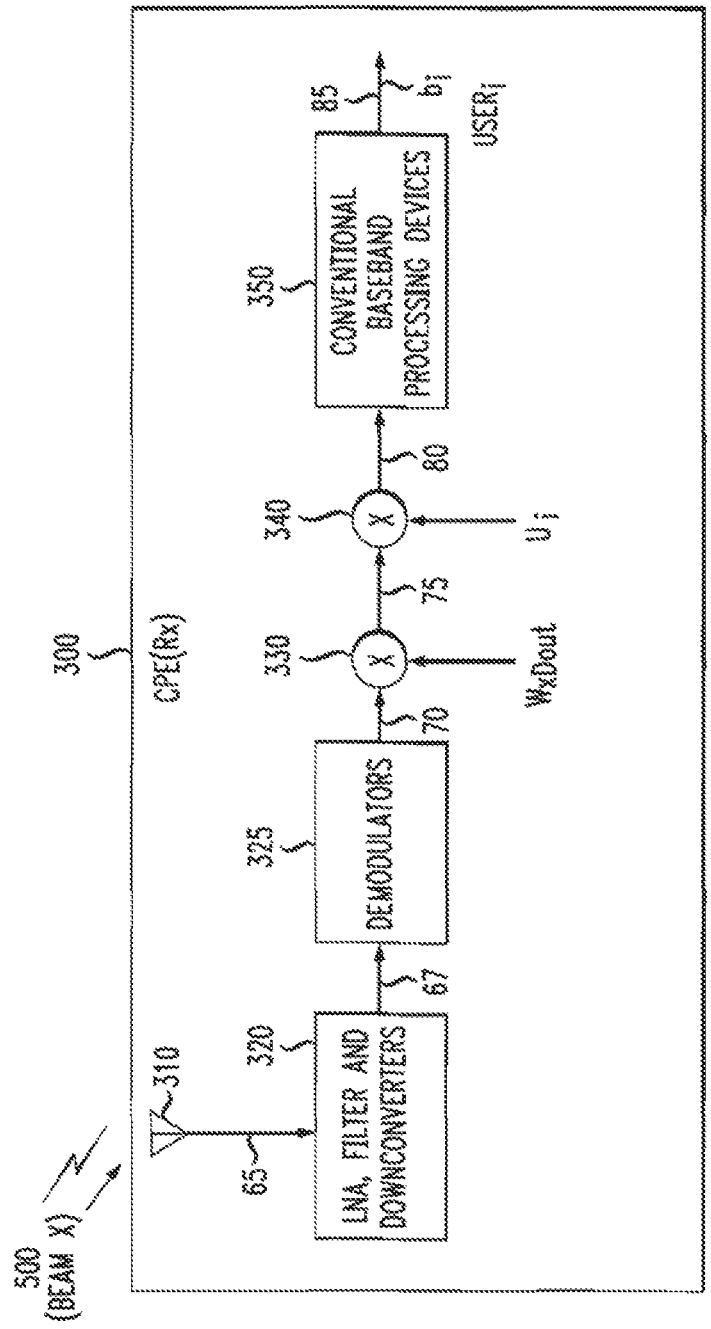
FIG. 3 shows a illustrative embodiment of a receiving CPE and the receive functions provided therein used in conjunction with the present invention.

As shown in FIG. 3, following transmission of the user signal 60 along destination beam 500 (Beam X), the user signals are received at the destination CPE(Rx) 300 as received user signals 65. Beam X 500 enters the receiving CPE(Rx) 300 through antenna 310. Signals 65 are then input to conventional radio processing devices 320 that low-noise amplify, filter and down-convert, corresponding to the appropriate frequency of the incoming signal, beam 500 and produce isolated user signals 67. The operation of the LNA, filters and down-converters 320 and demodulator 325 merely reverse what was performed at the transmitting end prior to transmission of the user signals, thereby reversing what was performed by the modulators 260 and the up-converters, filters and power amplifiers 270 respectively. User signals 67 are then fed through the demodulator 325 to demodulate the signal and produce the demodulated signal 70.

The demodulated signal 70 is then input to a first digital decoder 330, in which the signal 70 is multiplied by the orthogonal code $W_{xDout}$. This operation rejects user signals from beams other than destination beam 500 (Beam X) received by CPE(Rx) 300.

For example, if CPE(Rx) 300 is located at the fringe of a geographic area associated with a particular destination beam 500, CPE(Rx) 300 will receive signals from adjacent beams. Hence, operation of the first digital decoder 330 filters unwanted, interfering user signals to produce a filtered signal 75 that is free from user signals from destination beams other than destination beam 500 (Beam X).

The first digital decoder 330 produces intermediate isolated signals 75 that are fed to a second digital decoder 340. The decoder 340 applies the previously encoded destination user code $U_i$ applied at the transmitting CPE(Tx) 100 to reject all other destination user signals and isolate the specific user signal $b_i$, which is extracted by the decoder 340 to produce an extracted user signal 80. The extracted user signal 80 is then fed through conventional baseband processing devices 350, as described above, to produce an output signal 85 that is delivered to a receiving user at the receiving CPE(Rx) 300. Conventional baseband processing devices 350 apply the receiving CPE(Rx)'s own receive spreading code $U_i$ previously applied in the first encoder 110 of FIG. 1. This application of the spreading code removes all other user signals from the signal $b_i$ delivered to the receiving user.

The utility of the present invention is based in part on the significant reduction of the complexity of the switching. For example, in a conventional system, a single beam handling 1000 users (N) requires switching the signals for individual users, in addition to isolating a particular user. Therefore, there must be a 1000×1000 ($N^2$) matrix of circuitry for each beam. Using the present invention, a network handling 16 beams (M) requires only equipment necessary to set up and maintain a 16×16 ($M^2$) matrix of circuitry as opposed to each of the subsystem within the 16×16 ($M^2$) matrix having a 1000×1000 ($N^2$) switching matrix for the conventional system. This illustration is only meant to explain the reduced complexity of the associated circuitry and is in no way intended to limit the scope of the invention.

In a second embodiment, elements 230 and 240 in FIG. 2 are interchanged. Signals coming out of line labeled 40 are fed into the summing element 240. This element adds signals similar to 40, shown by arrows coming into element 240, coming from all other beams from their equivalent circuits 220 in a synchronized manner. The output of this element 40, labeled in FIG. 2 as signal 50, is fed into the multiplier element 230, wherein the chipping sequence $W_{xDin}$ Is applied. Thus, at the output of 230, labeled as 45, we have the collection of signals of all users from all beams destined for users in beam X. Signal 45 is fed into multiplier element 250, wherein the chipping sequence $W_{xDin}$ is applied. This provides inter-beam isolation on the destination beam for end user terminals.

This embodiment reduces the number of circuitry by orders of magnitude in comparison to FIG. 2. As opposed to needing number of circuits of the order of $M^2$, as described above, in this embodiment only number of circuits of the order of M are needed. This can be a significant saving in cost, power, weight, complexity and reliability. The embodiment described in FIG. 2 may have better signal processing gain due to pre-filtering by element 230, while the second embodiment may support a much larger number of user population at a slightly reduced signal processing gain resulting in a slightly degraded signal quality. Thus, both the first and second embodiments will have valuable applications.

In a third exemplary embodiment, the system and method dynamically switch communications to an on-board self-routing network when the number of origination and destination satellite beams exceed the number of system users by a predetermined threshold causing a predetermined system condition to occur. As previously mentioned, the present invention is most efficient when the number of system users is greater than the number of origination and destination satellite beams. Therefore, the third exemplary embodiment of the present invention initiates a dynamic communication network change when the difference between the number of users and the number of beams reaches a critical threshold and causes a predetermined condition (e.g., S/I ratio, bit-error rate, etc.) to occur.

Figure 4:
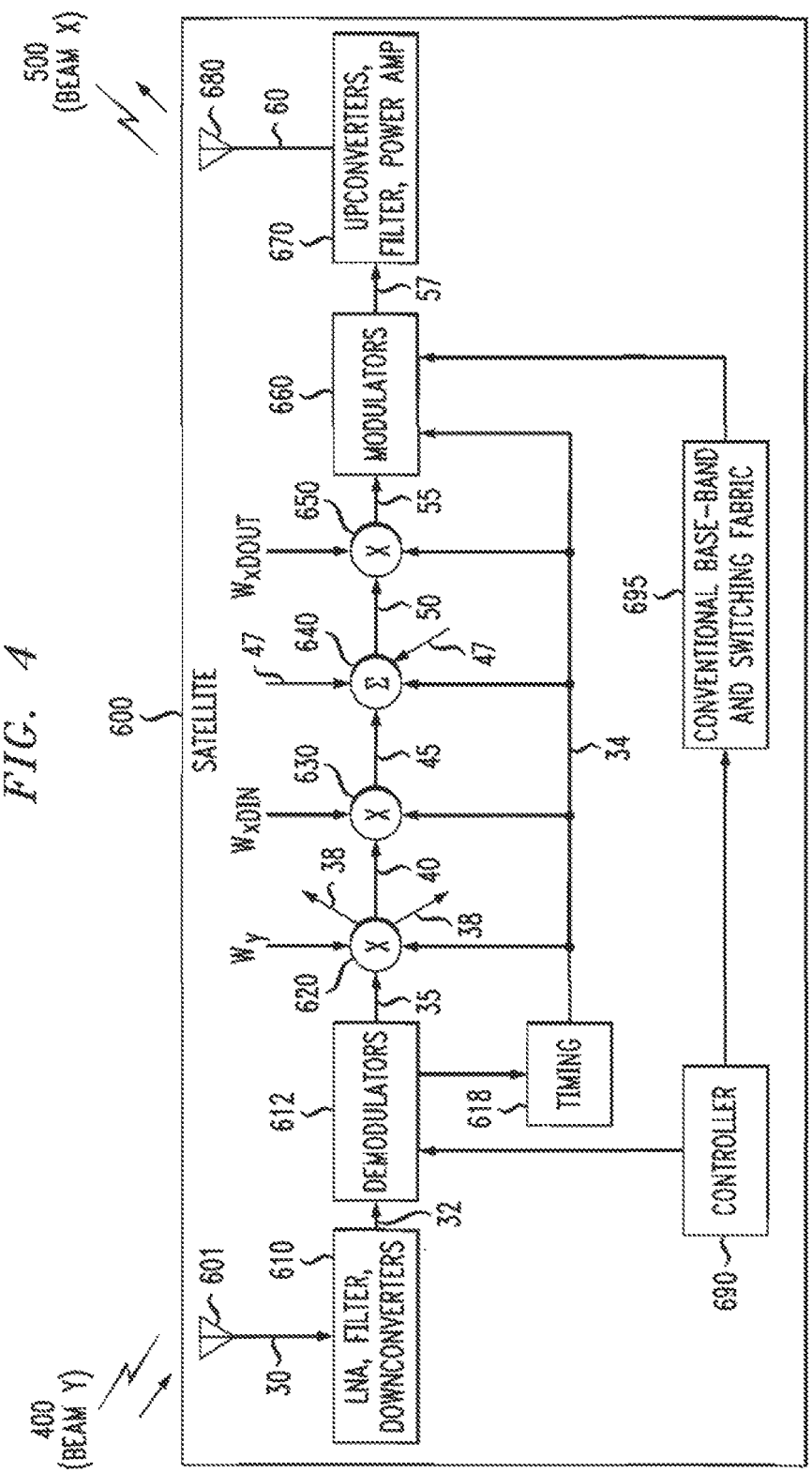
FIG. 4 shows a third exemplary embodiment of the present invention used in conjunction with an alternative network.

As shown in FIG. 4, such a predetermined condition initiates a system response that alters the effective operation of the circuitry on-board the satellite. FIG. 4 illustrates a satellite 600 identical to the satellite illustrated in FIG. 2 except that it includes an on-board controller 690 that monitors the number of origination and destination satellite beams (M) and the number of system users (N) during system operation.

When the number of beams M is greater than the number of users N by a predetermined amount and/or a predetermined system condition occurs based on deviation from optimum communication criteria (e.g., high destination beam bit error rate, low destination beam S/N ratio, poor repeater transmission conditions, etc.), the controller 690 initiates a switch that alters processing of the information on the origination beam 400 to conventional base-band and switching fabric 695 in which conventional self-routing digital processing is performed for each user signal. Therefore, in such conventional base-band and switching fabric 695, separate digital processing hardware circuit for each system user is provided on satellite 600.

In a third embodiment, the beam self-routing scheme of the first or second embodiments is combined with conventional technology, wherein individual user signals are recovered followed by switching, to provide both the benefits of the present invention and the conventional technology. Conventional technology presently affords recovery of user baseband signals, either fully, e.g., to user signal bits, or partially, e.g., symbol level, enabling correction of origination beam signal impairments.

As described above, this benefit is achieved at the price of excessive power, weight, size, system cost, system complexity and reduced reliability. However, when the number of users is large in comparison to the number of beams, which is typically the case, such an implementation is impractical and the implementation of the present invention is useful. However, at times when there are relatively few users in comparison to the number of beams, use of the conventional technology is beneficial because the number of circuits utilized on board the satellite is significantly reduced. Therefore, the detriments of the conventional technology, e.g., excessive power consumption, experienced by the system may be acceptable.

Therefore, in the third exemplary embodiment of the invention, the on-board equipment accommodates both scenarios. When the number of users is large, the realization shown in FIG. 2 is used, while if the number of users is few, then either partial or full baseband processing is employed. The latter approach is well known to those skilled in the art, and will not be described further herein; some of them are cited at the beginning of this filing.

This hybrid implementation is shown in FIG. 4. In the third exemplary embodiment, the system and method dynamically switch communications to an on-board self-routing network when the number of origination and destination satellite beams exceed the number of system users by a predetermined threshold or a predetermined system condition occurs. Likewise, when the number of users falls below the threshold, the communication path is switched to the conventional baseband processing. As previously mentioned, the present invention is most efficient when the number of system users is greater than the number of origination and destination satellite beams. Therefore, the third exemplary embodiment of the present invention initiates a dynamic communication network change when the difference between the number o fusers and the number of beams reaches a critical threshold.

The utility of the invention is based in part on the ability to route user signals from origination to destination without a switch processing any single user level signal. Moreover, when user signals are received and transmitted, no new information, e.g., user codes, call routing information, etc., needs to be entered into the processor/switch. Nothing changes in the processor/switch. No call-by-call processing is done on the processor/switch. Moreover, inter-circuit connections can be hard-wired at the time of manufacture to appropriately route user signals. Additionally, no route processing needs to be performed at the switch because route processing occurs automatically without the switching circuitry performing route processing analysis. Further, this bulk filtering and processing approach to switching may be followed by combining user signals in stages to permit routing of only those user signals that correspond to appropriate, e.g., verified, beams to be routed to the correct outgoing beams.

Further, in the transmitting CPE(Tx), the third level of spreading provided in the third encoder 130 may be omitted. There may be users close to the edge of a spot beam, and therefore the satellite may potentially pick up users who are on the fringe of multiple beams. It is beneficial to isolate such users, however, it is not necessary to practice the invention. The destination Beam Y orthogonal code is used to perform the routing/switching/filtering function within the satellite. The user code $U_i$ is used in conjunction with final stage of filtering in the CPE(Rx) 300 to ensure that data reaches the appropriate user. If there is sufficient radio frequency isolation between two adjacent destination beams, then the function of the third digital encoder 130 is to provide for a more robust system. It could possibly be omitted.

The satellite network example is used only illustratively and is not a hardware limitation upon the present invention. The present invention may be applied to a general wireless or wireline star network that routes user communication signals through a hub which routes the origination user signals to the appropriate destination path.

Implementation of this invention in conjunction with existing CDMA terminals, i.e., user terminals, requires little or no modifications. Rather than isolating the beams by the unique beam codes, the beams may be isolated by frequency, time or space characteristics. For example, if isolation is performed in frequency, then adjacent beams would be manipulated to vary in frequency. In existing TDMA systems, different beams use different frequencies, thereby making this invention readily applicable to systems using TDMA.

Additionally, if isolation is performed in space, the invention is applicable where there is no universal beam coverage, i.e., beam coverage is only in isolated locations and there are significant distances between the coverage areas. Further, standard CDMA telephones presently use user codes and beam codes in operation so the invention may easily be applied to a telephone network. Hence, the invention works with the complexity of the satellite and there is no need to change the user terminals such as CDMA telephones.

While this invention has been described in conjunction with the specific exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

Therefore, although the illustrative embodiments of the present invention are described using a wireless CDMA satellite communications network embodiment, it is not deemed departure from the spirit and scope of the present invention to apply the fundamental novel concepts to a similarly configured wireline or wireless communications network.

The utility of the present invention is not limited to processing of telephone calls. Any reference to calls is merely illustrative. Therefore, the invention may be applied to processing of all types of end-to-end communications such as packet technology.

The only potential modification to existing systems involves the transmission of the user signals. During transmission, the destination beam 500 (Beam X) satellite input orthogonal code $W_{xDin}$ is applied. Because this is generally not performed in conventional systems—i.e., the second digital encoder 120 is missing from conventional CPE transmitters—a CPE transmitter must be modified to isolate user signals being transmitted to a particular destination beam X on the satellite.

Further, the invention may be practiced in conjunction with different forms of CDMA, e.g., synchronous/asynchronous CDMA, orthogonal CDMA, etc. When operating with orthogonal or non-orthogonal CDMA, time synchronization is essential. When operation is performed in connection with non-orthogonal CDMA, synchronization is less problematic because there is no need to be chip synchronous, especially in origination beams.

Moreover, the invention may implemented without a satellite, i.e., all aspects of the system can be ground-based.

Therefore, although the exemplary embodiments of the invention have been described as a method and system for satellite baseband self-routing, the present invention encompasses all viable variations of the exemplary design including any wireless or wireline star network (communications network which uses a hub to route user data).

What is claimed is:

1. Destination equipment for receiving a plurality of encoded user signals including a specific encoded user signal, the specific encoded user signal being contained in a particular destination beam of a plurality of destination beams transmitted from on-board satellite equipment, the destination equipment comprising:
   a first digital decoder comprising a processor and computer readable media containing computer readable instructions that, when executed by the processor, cause the first digital decoder to apply on the plurality of encoded user signals an orthogonal code previously applied to the particular destination beam by the on-board satellite equipment, wherein applying the orthogonal code extracts a subset of the plurality of encoded user signals that are received in the particular destination beam, to create a first intermediate digital signal; and
   a second digital decoder comprising a processor and computer readable media containing computer readable instructions that, when executed by the processor, cause the second digital decoder to apply on the first intermediate digital signal a destination user code previously applied to the specific encoded user signal by a terrestrial transmitter prior to a transmission to the on-board satellite equipment, wherein applying the destination user code extracts the specific encoded user signal from the subset of the plurality of encoded user signals.

2. The destination equipment of claim 1, further comprising:
- a low-noise amplifier, a filter and a down-converter connected between an antenna and the first digital decoder to receive a radio signal from the antenna and to isolate the plurality of encoded user signals from the radio signal.

3. The destination equipment of claim 2, further comprising a demodulator for demodulating an output of the low-noise amplifier, filter and down-converter.

4. The destination equipment of claim 1, further comprising:
- baseband processing devices connected to the second digital decoder for producing an output signal for delivery to customer premises equipment.

5. The destination equipment of claim 1, wherein the first and second digital decoders are code division multiple access decoders.

6. The destination equipment of claim 1, wherein the destination user is a code division multiple access spreading code.

7. The destination equipment of claim 1, wherein the destination user code is a code selected from the group consisting of a gold code, a Walsh code and a PN sequence.

8. The destination equipment of claim 1, wherein use of the orthogonal code improves a signal-to-interference ratio of the particular destination beam.

9. The destination equipment of claim 1, wherein the first digital decoder is one of a plurality of digital decoders applying respective orthogonal codes on the plurality of encoded user signals, each respective orthogonal code being unique to a respective particular destination beam, each respective digital decoder being for extracting a respective subset of the plurality of encoded user signals that are received in the respective particular destination beam.

10. The destination equipment of claim 1, wherein applying the orthogonal code rejects encoded user signals of the plurality of encoded user signals that are not received in the particular destination beam.

11. A method for receiving a plurality of encoded user signals including a specific encoded user signal, the specific encoded user signal being contained in a particular destination beam of a plurality of destination beams transmitted from on-board satellite equipment, the method comprising:
- by a first digital decoder, applying on the plurality of encoded user signals an orthogonal code previously applied to the particular destination beam by the on-board satellite equipment, wherein applying the orthogonal code extracts a subset of the plurality of encoded user signals that are received in the particular destination beam, to create a first intermediate digital signal; and
- by a second digital decoder, applying on the first intermediate digital signal a destination user code previously applied to the specific encoded user signal by a terrestrial transmitter prior to a transmission to the on-board satellite equipment, wherein applying the destination user code extracts the specific encoded user signal from the subset of the plurality of encoded user signals.

12. The method of claim 11, further comprising:
- by low-noise amplifier, a filter and a down-converter connected between an antenna and the first digital decoder, receiving a radio signal from the antenna and isolating the plurality of encoded user signals from the radio signal.

13. The method of claim 12, further comprising:
- demodulating an output of the low-noise amplifier, filter and down-converter.

14. The method of claim 11, further comprising:
- by a baseband processing device connected to the second digital decoder, producing an output signal for delivery to customer premises equipment.

15. The method of claim 11, wherein the first and second digital decoders are code division multiple access decoders.

16. The method of claim 11, wherein the destination user is a code division multiple access spreading code.

17. The method of claim 11, wherein the destination user code is a code selected from the group consisting of a gold code, a Walsh code and a PN sequence.

18. The method of claim 11, wherein use of the orthogonal code improves a signal-to-interference ratio of the particular destination beam.

19. The method of claim 11, wherein the first digital decoder is one of a plurality of digital decoders applying respective orthogonal codes on the plurality of encoded user signals, each respective orthogonal code being unique to a respective particular destination beam, each respective digital decoder being for extracting a respective subset of the plurality of encoded user signals that are received in the respective particular destination beam.

20. The method of claim 11, wherein applying the orthogonal code rejects encoded user signals of the plurality of encoded user signals that are not received in the particular destination beam.

* * * * *